United States Patent [19]

Kawasaki et al.

[11] Patent Number: 5,459,092
[45] Date of Patent: Oct. 17, 1995

[54] METHOD FOR FABRICATING AN ACTIVE MATRIX ADDRESSED LIQUID CRYSTAL IMAGE DEVICE

[75] Inventors: Kiyohiro Kawasaki, Hirakata; Hiroyoshi Takezawa, Ishikawa, both of Japan

[73] Assignee: Matsushita Electric Industrial Co., Ltd., Osaka, Japan

[21] Appl. No.: 123,197

[22] Filed: Sep. 20, 1993

Related U.S. Application Data

[60] Continuation of Ser. No. 840,000, Feb. 24, 1992, abandoned, which is a division of Ser. No. 467,548, Jan. 19, 1990, Pat. No. 5,124,823.

[30] Foreign Application Priority Data

| Jan. 27, 1989 | [JP] | Japan | 1-017949 |
| Nov. 6, 1989 | [JP] | Japan | 1-288368 |

[51] Int. Cl.⁶ .................. H01L 21/86; H01L 21/308
[52] U.S. Cl. ............... 437/51; 437/229; 437/246
[58] Field of Search .................. 437/51, 47, 60, 437/229, 245, 246, 181, 187, 231; 359/67, 79, 59; 148/DIG. 75, DIG. 137

[56] References Cited

U.S. PATENT DOCUMENTS

| 4,097,121 | 6/1978 | Tauer | 359/54 |
| 4,572,617 | 2/1986 | Masaki et al. | 359/79 |
| 4,589,733 | 5/1986 | Yaniv et al. | |
| 4,759,610 | 7/1988 | Yanagisawa | 359/59 |
| 4,770,501 | 9/1988 | Tamura et al. | 359/59 |
| 4,790,630 | 12/1988 | Maurice | 437/60 |
| 4,821,092 | 4/1989 | Noguchi | |
| 4,855,806 | 8/1989 | Parks et al. | 359/59 |
| 4,907,861 | 3/1990 | Muto | |
| 4,929,569 | 5/1990 | Yaniv et al. | 437/51 |
| 5,003,356 | 3/1991 | Wakai et al. | |

FOREIGN PATENT DOCUMENTS

| 0193759 | 9/1986 | European Pat. Off. |
| 0271960 | 6/1988 | European Pat. Off. |
| 0304657 | 3/1989 | European Pat. Off. |
| 0068655 | 6/1979 | Japan |
| 57-53966 | 3/1982 | Japan ................ 437/229 |
| 0017720 | 1/1985 | Japan |
| 61-67023 | 4/1986 | Japan |
| 62-80629 | 4/1987 | Japan |
| 62-136049 | 6/1987 | Japan |
| 62-231224 | 10/1987 | Japan |
| 62-122224 | 5/1988 | Japan |
| 63-250155 | 10/1988 | Japan |

OTHER PUBLICATIONS

English Translation of Hara (61–67023).
English Translation of Ooba et al (62–231224).
English Translation of Shimoda (57–53966).
Wolf et al, "Silicon Processing for the VLSI Era" vol. 1, 1986, pp. 428–429.
Ghandhi, "VLSI Fabrication Principles", 1983, pp. 533, 541–548, 556–560.

*Primary Examiner*—Brian E. Hearn
*Assistant Examiner*—Michael Trinh
*Attorney, Agent, or Firm*—Stevens, Davis, Miller & Mosher

[57] ABSTRACT

A liquid crystal image display device comprising an insulating substrate having plural scanning lines and signal lines and a switching device and a pixel electrode provided for each of pixels, a light-transmissive insulating substrate having a transparent conductive counter electrode and liquid crystal filled between both substrates, wherein said signal lines or scanning lines for supplying electric signals to said switching devices and conductive paths for connecting said switching devices with the pixel electrodes are coated with an thick organic film so as to be electrically isolated from said liquid crystal.

1 Claim, 4 Drawing Sheets

METHOD FOR FABRICATING AN ACTIVE MATRIX ADDRESSED LIQUID CRYSTAL IMAGE DEVICE

This application is a continuation of application Ser. No. 840,000, filed Feb. 24, 1992 (abandoned) which is a division of application Ser. No. 467,548 filed Jan. 19, 1990 (U.S. Pat. No. 5,124,823).

BACKGROUND OF THE INVENTION

The present invention relates to a liquid crystal panel for displaying an image, and more particularly to passivation which is useful for an active matrix addressed liquid crystal image display incorporating a switching device for each pixel.

In an active matrix addressed liquid crystal panel it is difficult to drive all the liquid crystal cells under the same condition because of its complicated device structure and because it is prone to generate a phenomenon wherein a displayed image glimmers. As is well known, this phenomenon (also called "flicker") occurs when the matrix addressed liquid crystal panel is observed aslant, or a large amount of D.C. component is contained in a driving signal;

In order to reduce the flicker, two techniques have been proposed. One is to fabricate the components constituting the panel, i.e. liquid crystal cells formed of insulated-gate transistors and storage capacitors, with high accuracy so that all the liquid crystal cells can be driven under the same condition, The other is to reduce the flicker visually, more specifically, to drive the adjacent liquid crystal cells in phases opposite to each other so that the flicker is not observed on the entire panel.

Both techniques, however, have the following drawbacks. In the former, the condition of fabricating an active substrate and assembling the panel is strictly set and also a large storage capacitance is required; this will reduce the fabricating yield and the numerical aperture. On the other hand, in the latter, the flicker can be reduced apparently, but the counter electrode is A.C. driven under the condition held at a constant voltage so that the signal voltage will be boosted. This will increase the minute fluctuated D.C. voltage component among the liquid cells which will cause the flicker, so that the liquid crystal is deteriorated and become brown over use for a long time, thus providing poor image quality.

Essentially, if as shown in FIG. 6, an orienting organic thin film 18 completely insulate the surfaces of a signal line 12, a drain wiring 22, a pixel electrode 14, etc. a D.C. current will not flow into a liquid crystal cell 13 consisting of the pixel electrode 14, a counter electrode 15 and a liquid crystal layer 16, and so the liquid crystal layer 16 will not also be deteriorated. The orienting film 18 alone, however, cannot completely insulate the surfaces of the signal line 12, the drain wiring 22, the pixel electrode 14, etc. because the orienting film 18 is thin (about 0.1 μm), is liable to contain pinholes because it is applied generally by offset printing, and is cured or thermally set at a comparatively low temperature of 300° C. or lower so that the active devices and the colored layer 17 of a color filter 9 are not thermally destroyed; it is difficult to prevent the liquid crystal layer 16 from deteriorating more or less. Particularly, the D.C. component is liable to flow between the signal line 12 and the counter electrode 15 because the signal voltage continues to be externally applied to the signal line 12. Thus, in order to prevent the liquid crystal layer from becoming deteriorated, as shown in FIG. 7, it is proposed to coat the entire surface of an active substrate 2 with a transparent insulating film of $Si_3N_4$ having a thickness of 0.5 μm in place of the thin orienting film.

This technique of depositing the thick passivation film 23 on the entire surface, however, is also not necessarily preferable since it lengthens the fabricating process, and the presence of the excess insulating layer on the pixel electrode 14 reduces the effective voltage to be applied to the liquid crystal layer 16. Although the problem of the reduction of the effective voltage can be solved by selectively removing the passivation film 23 on the pixel electrode, a large level difference in the passivation film occurs on the it impossible to regularly rub the orienting film 18 with a dry cloth, so that the orientation of the liquid crystal falls into disorder to produce inverted domains this eventually reduces the image quality. Further, in order to obtain the passivation film 23 having good film quality, the active elements are required to have strict heat resistance; this makes it difficult to ensure the characteristic of the insulated gate transistors.

SUMMARY OF THE INVENTION

An object of the present invention is to provide an active matrix addressed liquid crystal image display free from flicker and with improved image quality.

This object can be attained by selectively depositing a photo-sensitive poly-imide on a signal line and a drain wiring to insulate only the signal line and drain wiring thereby to prevent a D.C. current from flowing into the liquid crystal cells.

The selective deposition of the poly-imide thin film on only the signal line and drain wiring will not reduce the voltage to be applied to the liquid crystal layer, and makes it unnecessary to provide the step of depositing the passivation layer which lengthens the fabricating process with resulting increase in production costs.

DESCRIPTION OF THE PREFERRED EMBODIMENTS

Figure 4:
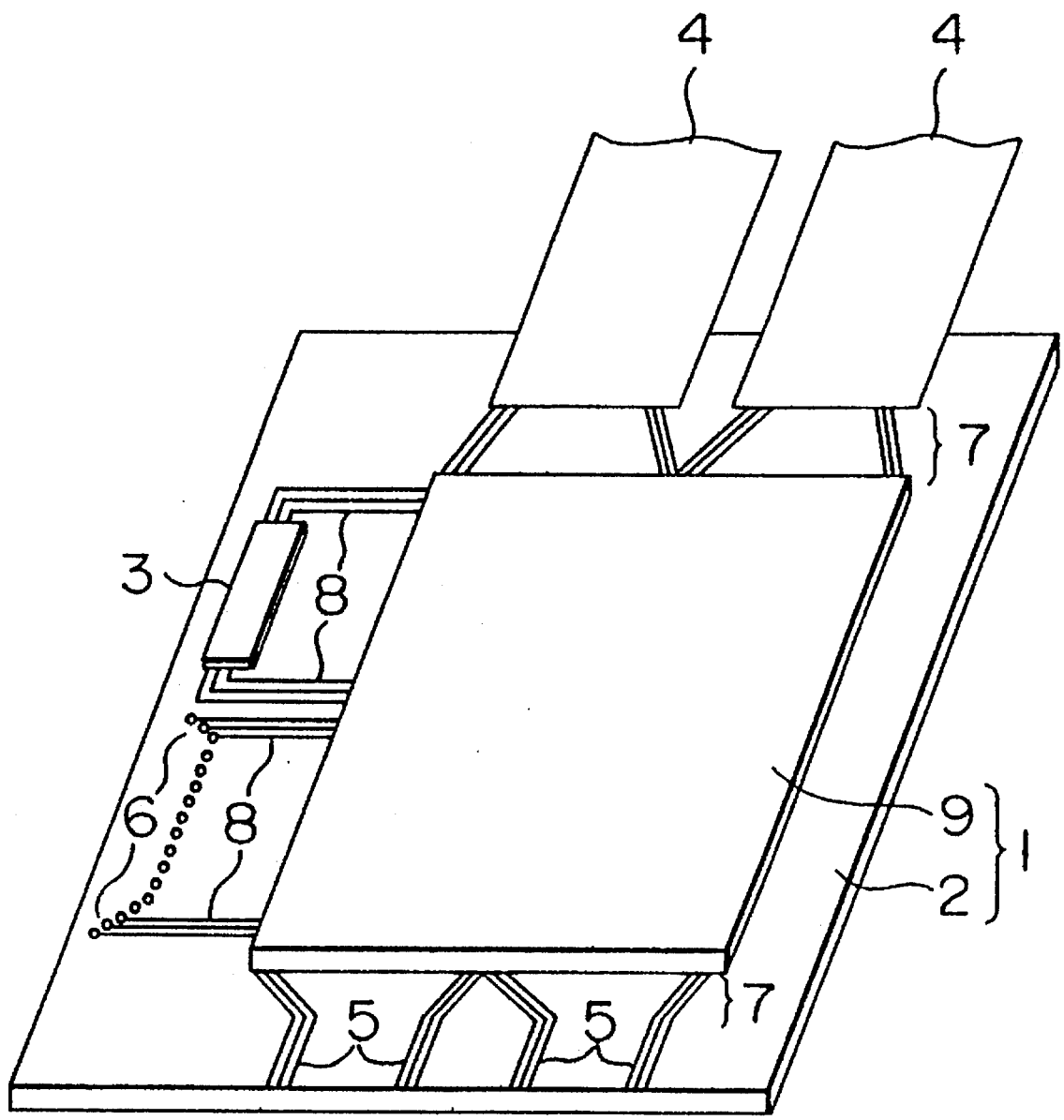
FIG. 4 is a perspective view showing the packaging of a liquid crystal panel.

With the development of fine processing technology, liquid crystal material, packaging technology, etc., a television image which can be actually adopted, although its size is as small as 2 to 6 inches, has been obtained commercially by a liquid crystal image display, simply referred to a liquid crystal panel. By forming a colored layer of R, G and B on one of two glass substrates constituting the liquid crystal panel, a color display can also be realized. Further, an "active" liquid crystal panel incorporating a switching device for each pixel can assure an image with less crosstalk and high contrast. Such a liquid crystal panel is organized typically in a matrix consisting of 120–240 scanning lines and 240–720 signal lines. Also, as shown in FIG. 4, an electric signal is supplied to an image display part through the packaging means such as a COG (Chip-On-Glass) technique of directly connecting a semiconductor integrated circuit chip 3 for supplying a driving signal to a group of electrode terminals 6 for the scanning lines formed on one (e.g. glass substrate 2) of the insulating substrates constituting the liquid crystal panel 1, or fixing connection films 4 each having a group of gold-plated copper foil terminals (not shown) on a base of a poly-imide resin thin film onto electrode terminals 5 for the signal lines through pressing using adhesive. Although two techniques are shown in FIG. 4 for convenience of illustration, it is needless to say that either one technique is selected. Additionally, 7 and 8 are wiring paths of connecting the image display part centrally located on the liquid crystal panel I and groups of electrode terminals 5 and 6 for the signal lines and scanning lines, and are not required to be made of the same material as the groups of electrode terminals.

Transparent insulating glass substrate 9 has a transparent (light-transmissive) conductive counter electrode common to all the pixel electrodes. These glass substrates 2 and 9 are spaced apart from each other by a predetermined distance through a spacer such as quartz fiber, plastic beads, or the like. The gap thus formed constitutes a closed space sealed by sealing material, and the closed space is filled with liquid crystal. In many cases, an organic thin film called a colored layer containing at least one of dye and pigment is deposited on the side of the closed gap of the glass substrate 9 to provide a function of color display; the glass substrate is also called a color filter. In accordance with the property of the liquid crystal, a polarization plate is bonded on at least one of the upper surface of the glass substrate 9 and the lower surface of the glass substrate 2 so that the liquid crystal panel 1 serves as an electro-optical device. Incidentally, although the substrates 2 and 9 are formed of glass in the above light-transmissive type liquid crystal panel, they are not required to be transparent like glass in a light-reflective type liquid crystal panel.

Figure 5:
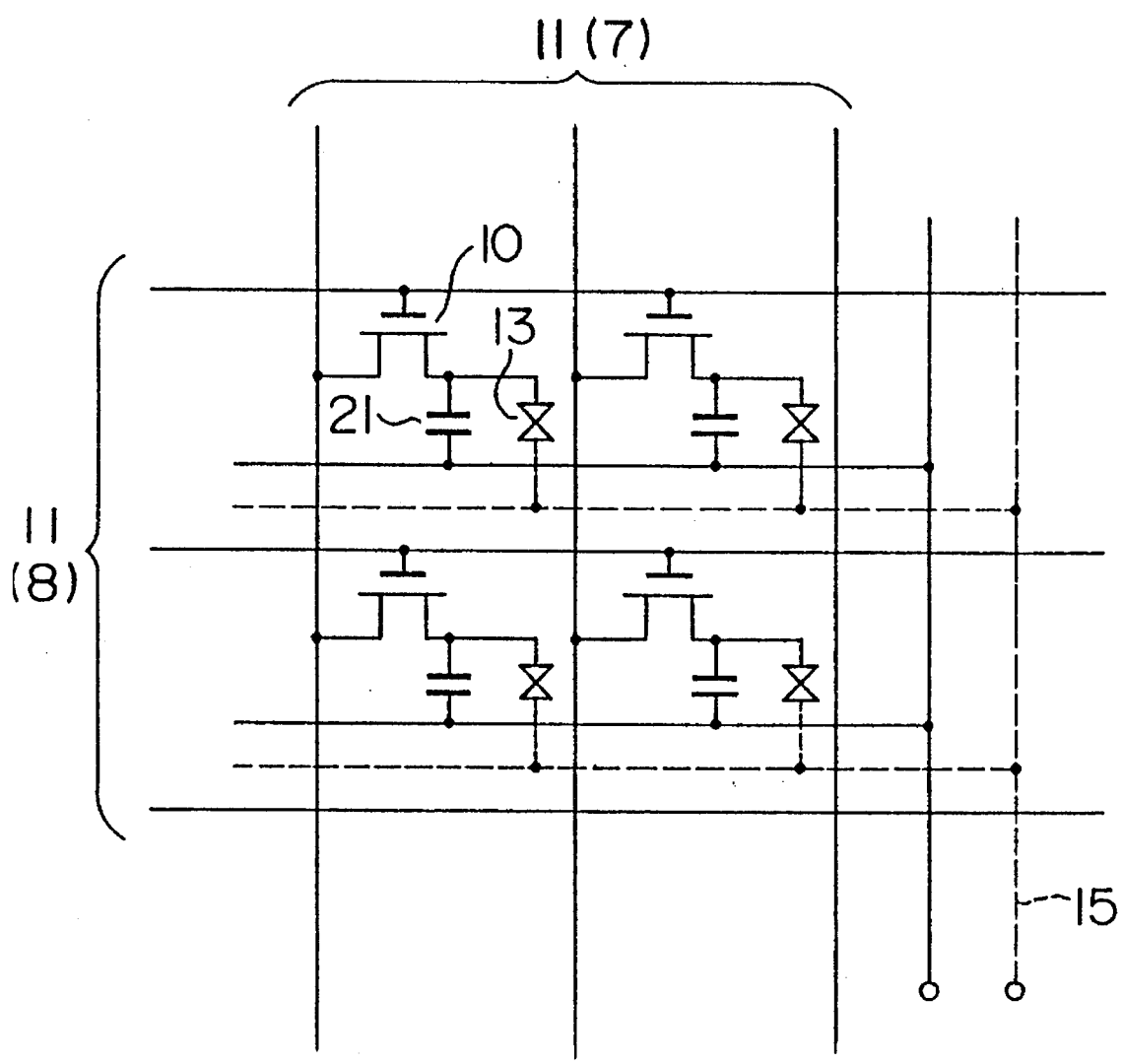
FIG. 5 is an equivalent circuit diagram of an active liquid crystal panel.
Figure 6:
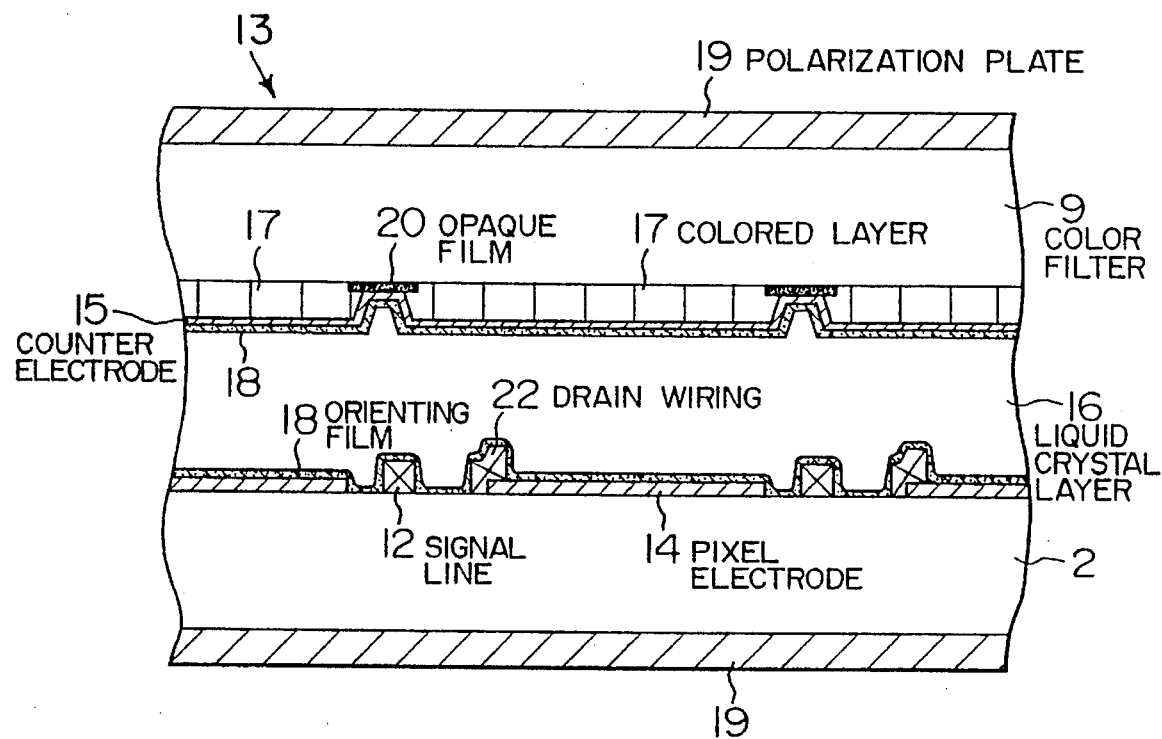
FIG. 6 is a sectional view of the main part of the panel of FIG. 5.
Figure 7:
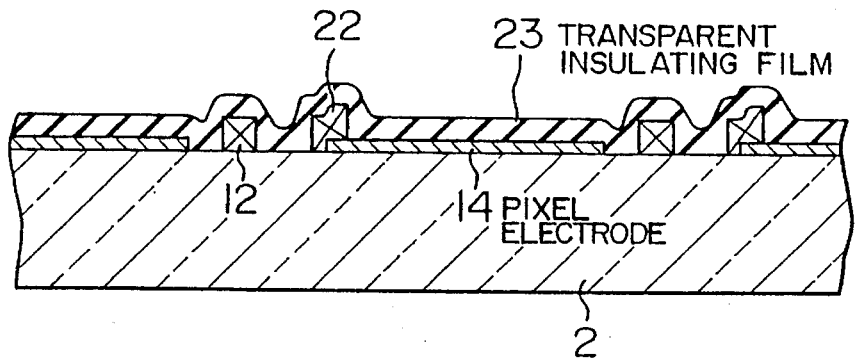
FIG. 7 is a sectional view of the passivation in the prior art which was carried out to prevent the liquid crystal from deteriorating.

FIG. 5 is an equivalent circuit diagram of an active liquid crystal panel in which an insulated gate transistor 10 as a switching device is provided for each pixel, and FIG. 6 is a sectional view of the main part of the panel of FIG. 5. The device components drawn by a solid line are formed on one glass substrate 2 whereas the transistor device drawn by a broken line is formed on the other glass substrate 9. Scanning lines 11 (8) and signal lines 12 (7) are formed on the glass substrate 2 simultaneously with the fabrication of the thin film transistor 10 having e.g. amorphous silicon as a semiconductor layer and a silicon nitride ($Si_3N_4$) film as a gate insulating film. As seen from FIG. 6, liquid cell 13 is composed of a transparent conductive pixel electrode 14 formed on the glass substrate 2, a transparent conductive counter electrode 15 formed on the color filter 9 and liquid crystal 16 filling the closed space between the substrates 2 and 9. Cell 13 functions electrically like a capacitor.

As mentioned above, colored layers 17 of colored photo-sensitive gelatin, coloring photo-sensitive resin, or the like are arranged, in a predetermined array of three primary colors of R, G and B, on the side of the closed space of the color filter 9 in accordance with the pixel electrodes 14. The counter electrode 15 common to all the pixel electrodes 14 is formed on the colored layers 17 in order to obviate the voltage distributing loss due to the presence of the colored layers 17. Orienting films 18 for orienting liquid crystal molecules in a prescribed direction are deposited in contact with the liquid crystal on two glass substrates and are made of a poly-imide resin film e.g. about 0.1 μm. If the liquid crystal 16 used is twisted nematic (TN) type liquid crystal, two polarization plates 19 must be arranged up and down.

Low-reflective opaque films 20 arranged at the boundary among colored layers of R, G and B as shown in FIG. 6 prevent light from being reflected from the wiring layers such as the signal lines on the glass substrate 2 to thereby improve the contrast of the image, and restrain the leak current of the switching devices 10 from being increased owing to irradiation of external light thereby permitting the switching devices to be operated under strong external light; these opaque films have been realized as a black matrix. The black matrix can be formed of several kinds of material, but in view of the occurrence of level differences and light transmissivity at the boundary among the colored layers, it is convenient to form it using Cr thin films having a thickness of about 0.1 μm in spite of its high cost.

Incidentally, although a storage capacitor 21 shown in FIG. 5 is not necessarily an indispensable component of the active liquid crystal panel, it is very useful in order to improve the utilization efficiency of a driving signal source, restrain the difficulty of floating parasitic capacitance, relax the adverse effect of fluctuation of the characteristics of insulated gate transistors as switching devices, and remove the flicker of an image during a high temperature operation, and so it is adopted as required. For convenience of illustration, main components such as a light source, a spacer as well as the thin film transistors 10, scanning lines 11 and the storage capacitors 21 are not shown in FIG. 6. A conductive thin film 22 (drain wiring) for connecting the pixel electrodes 14 and the drains of the insulated gate transistors 10; is typically formed simultaneously with the signal lines 12 and by the same material as the latter.

Figure 1:
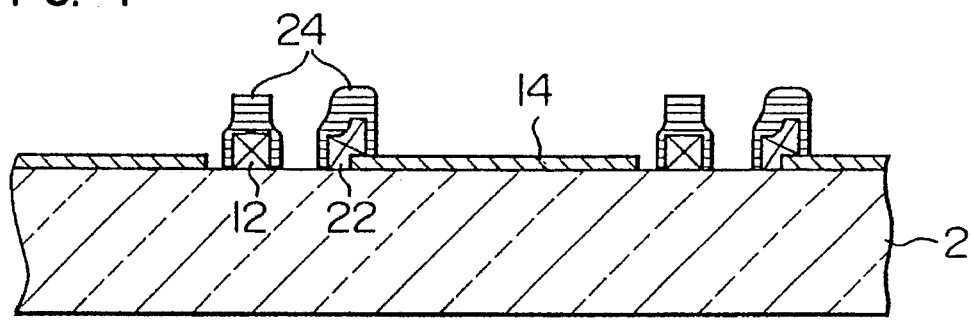
FIGS. 1 to 3 are sectional views of an active substrate of the liquid crystal image display according to each of the embodiments of the present inventions

Now referring to FIGS. 1 to 3, several embodiments of the present invention will be explained. FIG. 1 is a sectional view of the active substrate 2 constituting the liquid crystal image display device according to a first embodiment of the present invention. After the active substrate not having a passivation film on its entire surface has been fabricated by the conventional technique, as shown in FIG. 1, the signal line 12 and the drain wiring 22 are selectively coated with photo-sensitive poly-imide resin 24. The poly-imide resin may be PIMEL (trade name) available from ASAHI KASEI CO., LTD. If F-5524 grade is used, the resultant film thickness after it has been thermally set by heat treatment at 300° C. or more with the number of rotations of application of 4000 rpm is about 1 μm.

The above photosensitive poly-imide resin is organic resin in which poly-imide resin with excellent heat resistance and chemical resistance is supplied with the property of the photosensitive resin capable of forming a selective pattern through the irradiation of ultraviolet rays, and can be deposited by the same equipment and technique as the photosensitive resin. The only difference resides in that the photosensitive poly-imide resin must be subjected to heat treatment at 250°–450° C. (comparatively high for organic resin) in addition to the post-bake at about 150° C. which is carried out for the photosensitive resin after its development; the final film thickness and film quality after the resin has been thermally set depends on this heat treatment.

The embodiment shown in FIG. 1 requires a step of forming the photosensitive poly-imide resin coating 24 in addition to the conventional fabricating process; this increases the number of steps in the fabrication process by the step corresponding to substantially one photo-masking step. However, if the impurities contained in the liquid crystal material and the orienting film, particularly ionic impurities, can be removed so that the high purity of the liquid crystal layer 16 can be maintained, the fabricating process can be simplified as shown in FIG. 2. In a second embodiment shown in FIG. 2, first, a conductive thin film layer for forming the signal lines 12 and drain wirings 22, e.g. an aluminum layer 1 μm thick is deposited. Thereafter, patterns 26 and 27 of photosensitive poly-imide corresponding to the device patterns are formed. Subsequently, the aluminum film is etched using the patterns 26 and 27 as masks to form the signal lines 12 and drain wirings 22. In this case, unlike the photosensitive resin in the conventional fabricating process, the photosensitive poly-imide resin patterns 26 and 27 are not removed but left as they are, thus completing the fabrication of the active substrate 2.

Figure 3A:
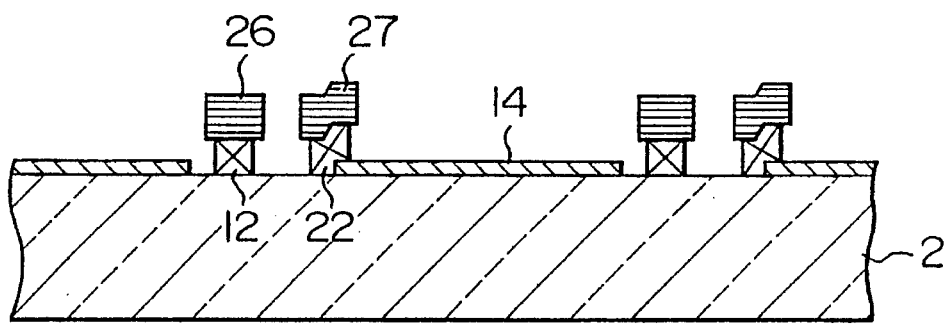
Figure 3B:
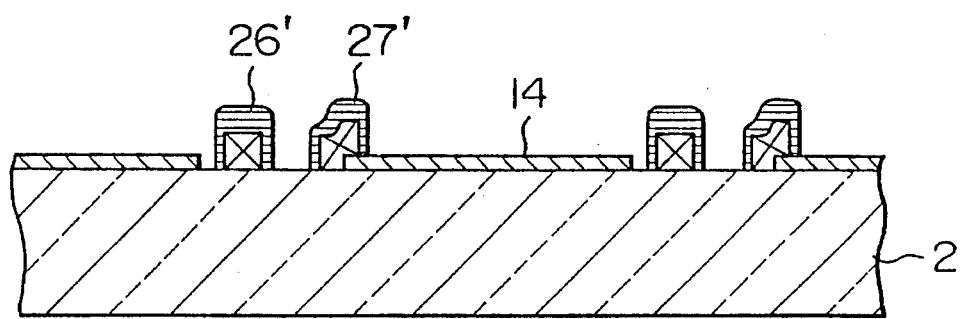

Otherwise, if the devices, including insulated gate transistors, have sufficiently high heat resistance, a third embodiment as shown in FIGS. 3A and 3B can be implemented. In this embodiment, as shown in FIG. 3A, first, a conductive thin film layer constituting the signal lines 12 and drain wirings 22, e.g. an aluminum layer 1 μm thick is deposited. Thereafter, patterns 26 and 27 of photosensitive poly-imide corresponding to the device patterns are formed. Subsequently, the aluminum film is etched using the patterns 26 and 27 as masks to form the signal lines 12 and drain wirings 22. Next, as shown in FIG. 3B, the active substrate 2 is heated to plastically deform the photosensitive poly-imide resin patterns 26 and 27 into patterns 26' and 27' so as to cover the sides of the signal lines 12 and the drain lines 22. In this embodiment, the property of the negative type photosensitive poly-imide resin wherein it is plastically deformed by heat treatment like the negative type photosensitive resin is effectively used. The amount of deformation increases as the heating temperature becomes high and the heating time becomes long; in view of the heat resistance of the active devices, it is convenient to slightly excessively etch the signal lines 12 and the drain wirings 22 as seen from FIG. 3A since the side covering is promoted by the plastic deformation. In this embodiment also, the photosensitive poly-imide resin patterns 26 and 27 are not removed but left as they are, thus completing the fabrication of the active substrate 2.

Figure 2:
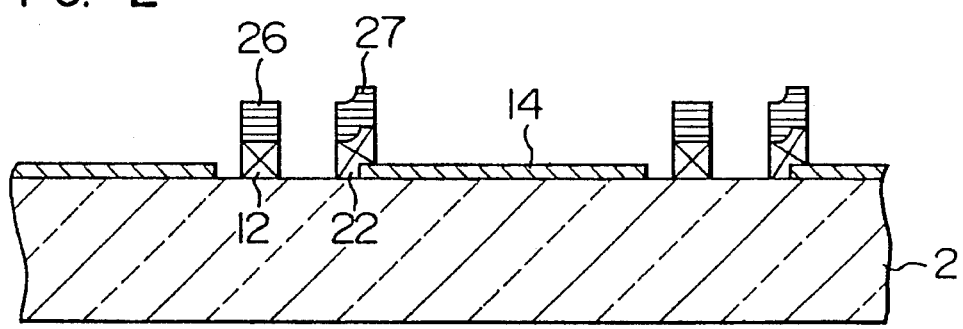

In the embodiments of FIG. 1 the entire surface of the signal lines 12 and the wiring lines 22 are coated with the poly-imide photosensitive resin, whereas in the embodiment of FIG. 2, only the upper surface thereof is coated with the resin but the side thereof is not coated. The pattern width of the signal lines 12 and the drain wirings is generally as thin as about 10 μm so that if the impurities in the liquid crystal layer 16 can be sufficiently removed as mentioned above, in the second embodiment, the D.C. current component due to ionic impurities decreases to ⅕ of the conventional technique and so the deterioration of the liquid crystal can be greatly restrained. The active substrate according to the second and third embodiments is formed into a liquid crystal panel under the state that the poly-imide resin is left on all the signal lines, so that the signal lines cannot be used as electrode terminals as they are. The electrode terminals are only required to be connected with the signal lines through openings made in the insulator layer using the other conductive material constituting the active substrate, e.g. the material ITO of the transparent electrode for the pixel electrode, or the metallic film such as Ta, Cr, etc. for the scanning lines. However, the presence of poly-imide resin makes it impossible to make connections by wire bonding for connection lines for disconnection relief of the same material, aluminum as the signal lines and a part of the signal lines so that the poly-imide resin is required to be removed. As the case may be, the signal lines are desired to be used as the electrode terminals as they are. A fourth embodiment of the present invention is effective to remove the poly-imide resin. This embodiment is implemented by placing the liquid crystal panel to selectively remove the poly-imide resin exposed on the active substrate in an atmosphere of $O_2$ gas plasma using the color filter (transparent substate 9) or counter glass.

On the other hand since, the active substrate according to the first embodiment is formed into a liquid panel in the state that the poly-imide resin is selectively deposited on the signal lines, it is not necessary to consider the above restriction on the signal lines exposed on the active substrate.

As explained hitherto, in accordance with the present invention, in order to stop or considerably reduce the D.C. current component which flows into the liquid crystal cells to deteriorate the liquid crystal, the signal lines and drain wirings are coated with thick insulating poly-imide resin. Thus, even when a high signal voltage is applied to the signal lines for flicker-less driving, the problem in quality that the liquid crystal is deteriorated so that the displayed image appears brown does not occur.

Moreover, since the poly-imide resin adopted in the present invention is photosensitive, it is possible to prevent the voltage effectively supplied to the liquid crystal cells from being lowered as compared with the conventional entire surface passivation using a transparent insulating thin film, so that no risk of darkening the displayed image occurs. Furthermore, the impurities in the liquid crystal cells can be sufficiently removed, or the heat resistance of the active substrate can be assured in some degree, the fabricating process can be shortened as compared with the conventional construction with no passivation. Further, in accordance with the present invention, connection lines for disconnection relief and wiring layers among semiconductor integrated circuit chips which are necessary for COG packaging can be formed simultaneously with the signal lines so that a redundant fabricating step is not required.

The construction of the active substrate, more specifically the location of the pixel electrodes in its thickness direction, which depends on the structure of insulated gate transistors and the fabricating process, has not been explained in this specification. Since the pixel electrodes are connected with the signal lines only in a switching manner through the insulated gate transistors, it is not necessary to insulate the drain wirings connecting the pixel electrodes with the insulated gate transistors in their surface. If the insulated gate transistors have a defect of being always 'ON', the liquid crystal may be deteriorated in its neighborhood; the drain wirings, therefore, are also desired to be insulated in accordance with the present invention. For the same reason, it is preferable that the pixel electrodes are not located on the uppermost layer of the active substrate, but covered with transparent insulating $SiO_2$ or $Si_3N_4$; this provides a high reliability liquid crystal image display device although some voltage loss is involved. Insulating the drain wirings simultaneously with the signal lines is only a design matter in the mask patterning, and in the case where the signal lines do not serve as the source wirings of insulated gate transistors, the same processing must be made for the source wirings.

In the construction in which the structure of insulated gate transistors is inverted, the signal lines are located below the insulating film and the scanning lines are located at the uppermost layer of the active substrate, the concept of the present invention may be applied to the scanning lines. The present invention is useful for not only the light-transmissive type liquid panel but also a light reflective type liquid panel in which the pixel electrodes are made of a metallic film.

An object of the present invention is to prevent the D.C. current component from flowing into the liquid crystal cells. The concept of the present invention can be applied to a liquid crystal image display device comprising a first insulating substrate having plural scanning lines and signal lines and a switching device and a pixel electrode provided for each of the pixels, a second light-transmissive insulating substrate having a transparent conductive counter electrode and liquid crystal filled between both substrates. The switching device may be not a three-terminal device such as an insulated gate transistor but be a two-terminal device having a threshold voltage and a non-linear voltage-current characteristic, such as an MIM (Metal-Insulator-Metal) device or a device consisting of plural pin diodes of a —Si connected in opposite direction. By coating the signal lines and/or the scanning lines with a thick organic film to electrically isolate the signal lines and/or scanning lines from the liquid crystal, a high reliability liquid crystal image display can be provided.

We claim:

1. A method for fabricating a liquid crystal image display device comprising a first insulating substrate having plural scanning wirings, signal wirings and drain wirings and an insulated gate transistor and a pixel electrode provided for each pixel of said liquid crystal image display device, a second light-transmissive insulating substrate smaller than said first insulating substrate and having a transparent conductive counter electrode spaced apart from said first insulating substrate and liquid crystal filled between both substrates, said method comprising the steps of:

(a) forming a coating of wiring material on said first insulating substrate;

(b) forming on said coating of wiring material and not on said pixel electrode a pattern of photosensitive poly-imide resin to define a pattern of said signal wirings and said drain wirings;

(c) selectively etching said coating of wiring material by using said pattern of said photosensitive poly-imide resin as a mask so as to form said drain wirings and said signal wirings; and (d) selectively removing a portion of said pattern of said photosensitive poly-imide resin that was formed on said first insulating substrate in step (b) from said first insulating substrate, said portion of said pattern being located around a periphery of said first insulating substrate, the selective removal of said portion of said pattern being performed by using said second light transmissive substrate as a mask through $O_2$ plasma.

* * * * *